May 29, 1923.
F. P. GIRODO
1,457,242
TRACTION SHOE FOR WHEELS
Filed Nov. 5, 1921
2 Sheets-Sheet 1
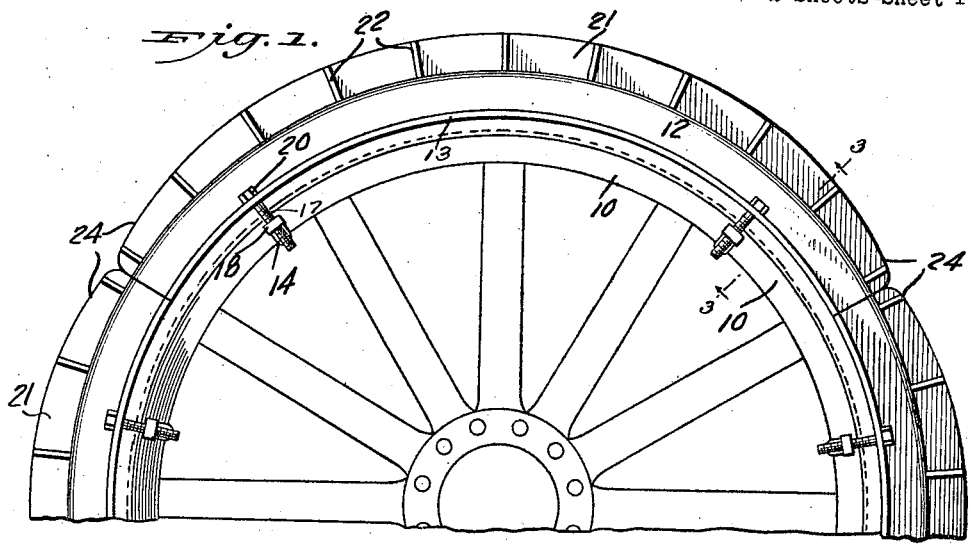
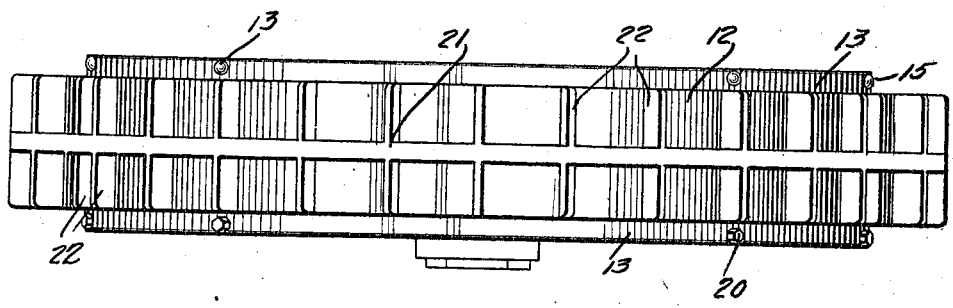
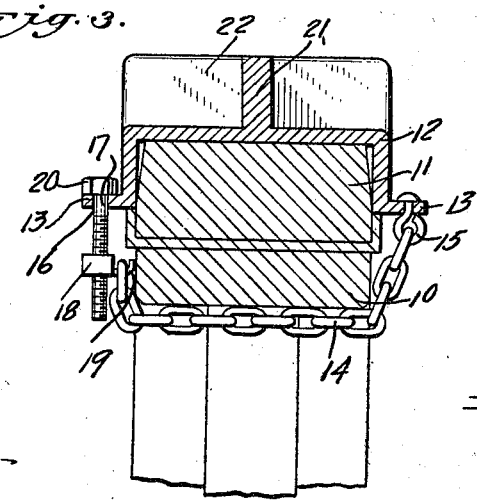
WITNESSES
INVENTOR
F. P. Girodo
BY
ATTORNEYS May 29, 1923.

F. P. GIRODO 1,457,242

TRACTION SHOE FOR WHEELS

Filed Nov. 5, 1921

WITNESSES

INVENTOR
F. P. Girodo
BY
ATTORNEYS

Patented May 29, 1923.

1,457,242

UNITED STATES PATENT OFFICE.

FREDERICK PETER GIRODO, OF NEW YORK, N. Y.

TRACTION SHOE FOR WHEELS.

Application filed November 5, 1921. Serial No. 513,185.

*To all whom it may concern:*

Be it known that I, FREDERICK P. GIRODO, a citizen of the United States, and a resident of the city of New York, borough of Manhattan, in the county and State of New York, have invented a new and Improved Traction Shoe for Wheels, of which the following is a full, clear, and exact description.

This invention has relation to attachments for the wheels of motor vehicles and relates more particularly to a traction shoe, especially designed as an attachment to the vehicle wheel for the purpose of extricating vehicles which have become mired or for assisting the same over bad stretches of road in which they are liable to become stuck.

The invention further contemplates an extremely simple and inexpensive attachment which is readily applicable to or removable from the driving wheels of the vehicle, and which when applied thereto operates to effectively obtain the necessary traction or purchase on the road to insure its extrication if mired.

As a further object, the invention contemplates a traction shoe applicable either to pleasure cars or motor trucks, which when applied embraces the tire and is secured to the felly or rim thereof, whereby to obviate the necessity of employing antiskid chains, thus eliminating wear or strain on the tire when extricating a mired vehicle or when the same is traveling over a bad road.

The device is further useful as an attachment to obtain proper traction on snow or ice covered roads, as well as to prevent skidding to a great extent under such conditions.

With the above recited and other objects in view, the invention resides in the novel construction set forth in the following specification, particularly pointed out in the appended claim and illustrated in the accompanying drawings, it being understood that the right is reserved to embodiments other than those actually illustrated herein to the full extent indicated by the general meaning of the terms in which the claim is expressed and by variations in the phraseology of the same.

In the drawings—

Figure 1 is a fragmentary side elevation illustrating the traction shoe applied to a truck wheel.

Fig. 2 is an edge view thereof.

Fig. 3 is a transverse sectional view taken approximately on the line 3—3 of Fig. 1.

Figure 4:
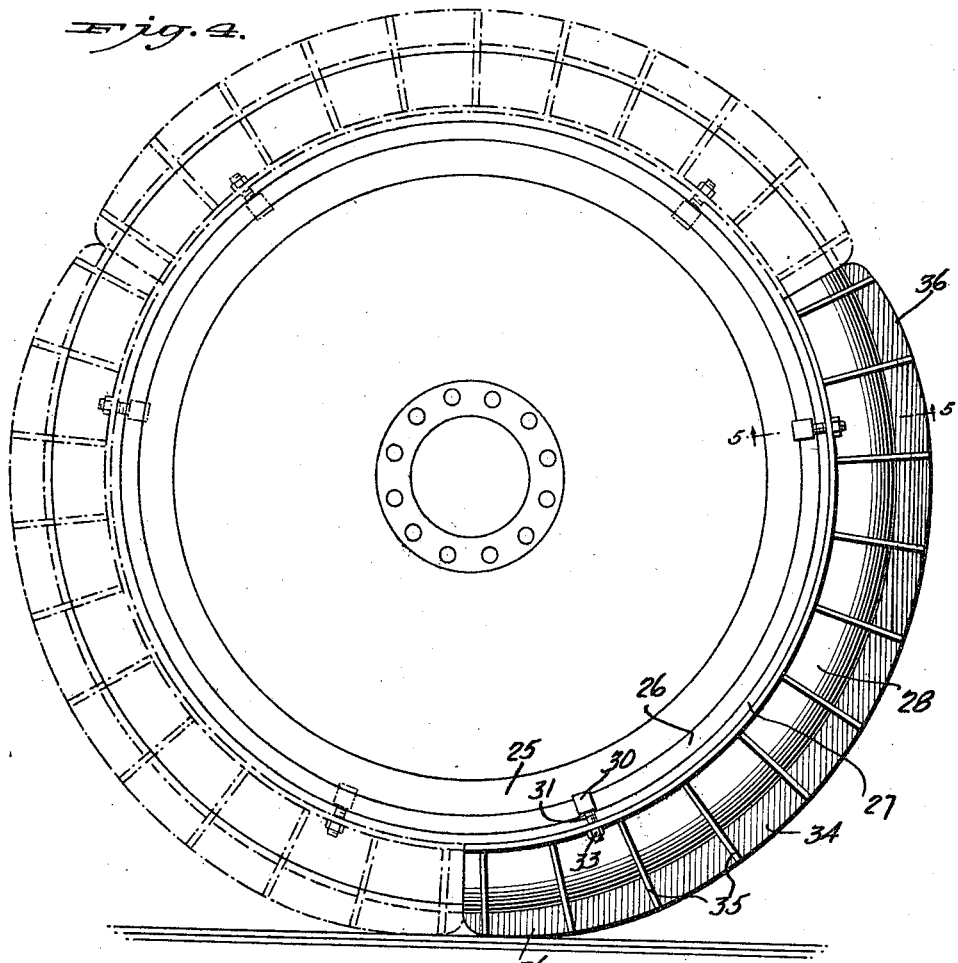
Fig. 4 is a side elevation illustrating the traction shoe applied to a disc wheel equipped with a pneumatic tire.

Referring to the drawings by characters of reference 10 designates the felly of a wheel, and 11 the tire, the same being particularly illustrated as a truck wheel equipped with a solid tire. The shoe constituting the invention consists of an arcuate body 12 shaped transversely to snugly receive and embrace the tire and preferably of a length to cover approximately one-third of the circumference thereof. The shoe is provided at its inner side edges with outwardly projecting flanges 13, one of which has connected therewith spaced chain sections 14 by a swivel 15. The opposite flange is apertured as at 16 to loosely receive a bolt 17 upon which a nut 18 is threadedly received, said nut having a laterally projecting hook 19 with which the links of the chain sections at its free extremity are engageable. In practice the free ends of the chain sections are passed under the felly and one of the links thereof is engaged with the hook 19; a wrench is then associated with the head 20 of the bolt 17 to advance the nut toward the head of the bolt in order to take up the slack in the chain and securely attaching the shoe to the wheel. The shoe body is provided on its outer face with a longitudinally extending central circumferential rib 21, the opposite ends of which terminate flush with the opposite ends of the body. A plurality of transverse radially projecting ribs 22 are provided on the outer face of the body and the body and said transverse ribs are preferably of the same thickness, while the central rib is preferably of a greater thickness to give a wider tread surface upon which the weight of the vehicle will be supported to prevent the cutting up of the road where the same is capable of affording the proper traction. The opposite extremities of the central rib are slightly eccentric and are of gradually decreasing height from their juncture with the major portion of the rib to the extreme outer ends thereof as illustrated at 24, the transverse ribs adjacent the ends of the shoe being correspondingly reduced in height whereby upon the initial application of the shoe, the vehicle will be gradually lifted or elevated by the shoe to prevent an abrupt elevation.

Figure 5:
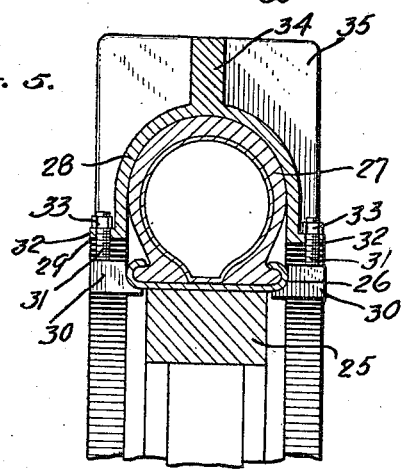
Fig. 5 is a transverse sectional view of the shoe shown in Figure 4 applied to a wheel with spokes, the section being approximately on the line 5—5 of Fig. 4.

In the modified form illustrated in Figs. 4 and 5, 25 designates the felly of a wheel of solid construction, 26 the rim, and 27 a pneumatic tire. The arcuate body 28 of the traction shoe is formed transversely to snugly fit and accommodate the tire and the same is provided with laterally projecting flanges 29, at the opposite sides of its inner edges. In instances where a wheel of solid construction precludes the employment of chain sections, the means for associating the shoe with the wheel must, of necessity, be varied. Therefore in lieu of the chain sections, clamping members 30 are employed which consist of blocks adapted to engage under the edge of the rim 26, said blocks having threaded stems 31 which project through apertures 32 in the flanges 29 and which receive securing and retaining nuts 33. The body 28 of the shoe is provided with a central circumferential traction rib 34 and transverse radially disposed traction ribs 35. In this instance the traction ribs 35 are of a width greater than the width of the body 28 and approximately equal to the distance between the outer edges of the flanges 29. Like the preferred form the opposite extremities of the central rib 34 are gradually reduced in height toward their extreme outer ends 36 and the transverse ribs 35 disposed adjacent the opposite ends of the arcuate body sections are correspondingly reduced in height to conform to the height of said ends 36 of the central rib.

In use and operation, the traction shoes may be employed singly on each drive wheel or if desired the same may be used to entirely embrace the wheel according to the desires of the driver of the vehicle. Where a vehicle has become mired, the shoe is applied to the driving wheels to permit the same to obtain the proper traction and purchase to extricate the same. In applying, the shoe is attached to the upper portion of the wheel and by driving the wheel, the same is brought into contact with the road bed, the reduced extremity first coacting with the road bed to gradually effect the elevation of the vehicle until the same finally rests on the higher portion of the central rib. The central rib and transverse ribs will operate to secure a solid purchase in the road bed to give the desired traction. Where the operator is cognizant of an approaching bad stretch of road, the shoes are attached to the wheel before reaching the same to preclude the possibility of becoming mired or stuck. The device will be found especially useful in the winter time on snow or ice covered roads to afford a proper traction and to eliminate to a great extent skidding.

I claim:

A traction shoe for vehicle wheels, comprising a segmental body adapted to be removably secured upon the tire of the wheel, said body being provided with a longitudinal rib having its ends gradually decreasing in height, and with a plurality of transverse ribs on each side of the longitudinal rib, the transverse ribs adjacent the ends of the body being reduced in height corresponding to the height of the ends of the longitudinal rib, the longitudinal rib being approximately double the thickness of the transverse ribs.

FREDERICK PETER GIRODO.